(12) United States Patent
Zhang et al.

(10) Patent No.: US 11,705,948 B2
(45) Date of Patent: Jul. 18, 2023

(54) ITERATIVE SELF INTERFERENCE MEASUREMENT WITH POWER RAMPING

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/319,625

(22) Filed: May 13, 2021

(65) Prior Publication Data

US 2021/0376892 A1    Dec. 2, 2021

Related U.S. Application Data

(60) Provisional application No. 63/033,726, filed on Jun. 2, 2020.

(51) Int. Cl.
*H04B 7/06* (2006.01)
*H04W 24/10* (2009.01)
*H04W 88/14* (2009.01)
*H04B 17/336* (2015.01)

(52) U.S. Cl.
CPC ......... *H04B 7/0617* (2013.01); *H04B 7/0623* (2013.01); *H04B 17/336* (2015.01); *H04W 24/10* (2013.01); *H04W 88/14* (2013.01)

(58) Field of Classification Search
CPC .. H04B 7/0617; H04B 7/0623; H04B 17/336; H04B 17/24; H04B 17/327; H04B 17/345; H04B 17/382; H04B 17/19; H04W 24/10; H04W 88/14; H04W 52/243; H04W 52/42
See application file for complete search history.

(56) References Cited

U.S. PATENT DOCUMENTS

2019/0260485 A1*  8/2019  Byun ................... H04B 17/336

FOREIGN PATENT DOCUMENTS

EP          3567760 A1      11/2019

OTHER PUBLICATIONS

International Search Report and Written Opinion—PCT/US2021/032606—ISA/EPO—dated Sep. 1, 2021.

* cited by examiner

*Primary Examiner* — Minh Trang T Nguyen
(74) *Attorney, Agent, or Firm* — Procopio, Cory, Hargreaves & Savitch

(57) ABSTRACT

A configuration for a wireless device to perform iterations of SIM to detect clutter echo in order to improve a configuration for SIM. The apparatus performs a SIM for multiple beam pairs based on a first transmission power. The apparatus performs an iteration of the SIM for one or more beam pairs that meet a criteria. The iteration of the SIM is based on a second transmission power. The second transmission power is greater than the first transmission power.

30 Claims, 13 Drawing Sheets

US 11,705,948 B2

ITERATIVE SELF INTERFERENCE MEASUREMENT WITH POWER RAMPING

CROSS REFERENCE TO RELATED APPLICATION(S)

This application claims the benefit of U.S. Provisional Application Ser. No. 63/033,726, entitled "Iterative Self Interference Measurement with Power Ramping" and filed on Jun. 2, 2020, which is expressly incorporated by reference herein in its entirety.

TECHNICAL FIELD

The present disclosure relates generally to communication systems, and more particularly, to a configuration for a self-interference measurement procedure in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first wireless device. The device may be a processor and/or a modem at a first wireless device or the first wireless device itself. The apparatus performs a self-interference measurement (SIM) for multiple downlink (DL) and uplink (UL) beam pairs based on a first transmission power in full duplex transmissions. The apparatus determines one or more beam pairs that meet a criteria. The apparatus performs an iteration of the SIM for the one or more beam pairs that meet the criteria, wherein the iteration of the SIM is based on a second transmission power that is increased from the first transmission power.

In an aspect of the disclosure, a method, a computer-readable medium, and an apparatus are provided. The apparatus may be a device at a first wireless device. The device may be a processor and/or a modem at a first wireless device or the first wireless device itself. The apparatus configures a self-interference measurement (SIM) configuration for multiple DL and UL beam pairs based on a first transmission power in full duplex transmissions. The apparatus transmits the SIM configuration to a second wireless device. The apparatus receives, from the second wireless device, cross beam measurements for top beam pair candidates and one or more beam pairs that meet a criteria based on the SIM performed with the first transmission power.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
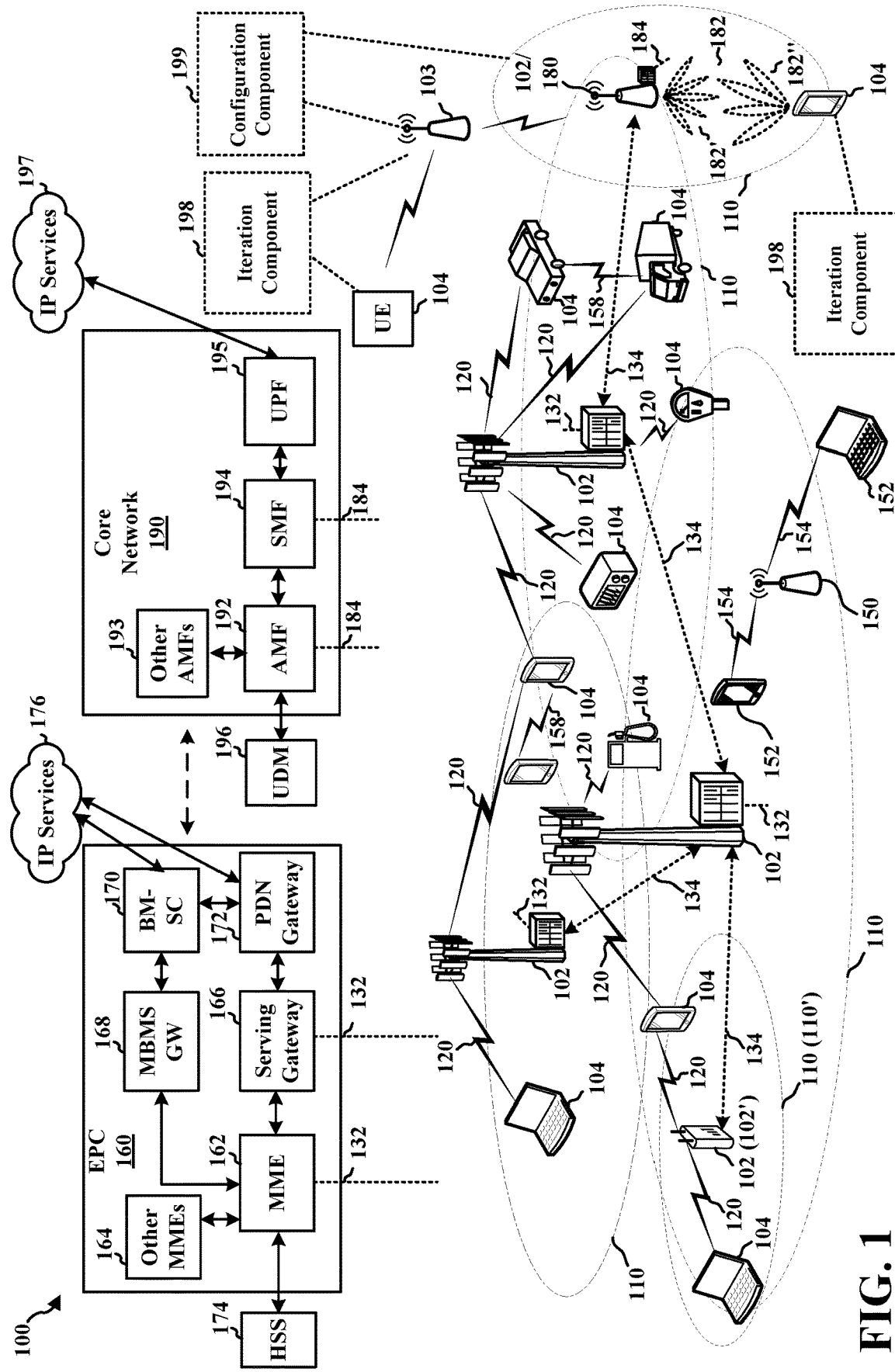
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communication system and access network 100 may include one or more UEs 104 in communication with a base station 102 or 180. The system may include UEs 104 in communication with other UEs 104. The wireless communication system and access network 100 may include an integrated access and backhaul (IAB) network that includes multiple cells in communication with each other to provide an access network and a backhaul network to a core network such as core network 190 or Evolved Packet Core (EPC) 160. The core network 190 may be a 5G Core (5GC) a core network that supports new radio (NR) communication or another type of core network. The IAB network may include one or more IAB nodes 103. The IAB nodes may exchange communication with other IAB nodes 103, with a base station 102 or 180, and/or with UEs 104.

Referring again to FIG. 1, in certain aspects, a wireless device such as the UE 104 or an IAB node 103 may be configured to perform iterations of SIM to detect clutter echo in order to improve a configuration for SIM. The IAB node 103 may be an IAB node, a child node or a parent node. For example, the UE 104 or IAB node 103 may include an iteration component 198 configured to perform an iteration of the SIM for one or more beam pairs. The UE 104 or IAB node may perform a SIM for multiple beam pairs based on a first transmission power. For example, the UE 104 may receive a SIM configuration from a base station 102 or 180 or from an IAB node 103. The IAB node 103 may receive the SIM configuration from a parent IAB node or from a base station 102 or 180. The UE 104 or IAB node may determine one or more beam pairs that meet a criteria. The UE 104 or IAB node may perform an iteration of the SIM for the one or more beam pairs that meet the criteria, wherein the iteration of the SIM may be based on a second transmission power that is increased from the first transmission power or from a previous transmission power.

Referring again to FIG. 1, in certain aspects, a base station 102 or 180 or an IAB Node 103 may be configured configure a SIM configuration for multiple beam pairs based on a first transmission power. For example, base station 102 or 180 or IAB Node 103 may include a configuration component 199 configured to configure the SIM configuration for multiple beam pairs. The base station 102 or 180 or the IAB Node 103 may configure a SIM configuration for multiple beam pairs based on a first transmission power. The base station 102 or 180 or the IAB Node 103 may transmit the SIM configuration to a second wireless device. The base station 102 or 180 or the IAB Node 103 may receive, from the second wireless device, cross beam measurements for top beam pair candidates and one or more beam pairs that meet a criteria based on the SIM performed with the first transmission power.

Although examples in the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
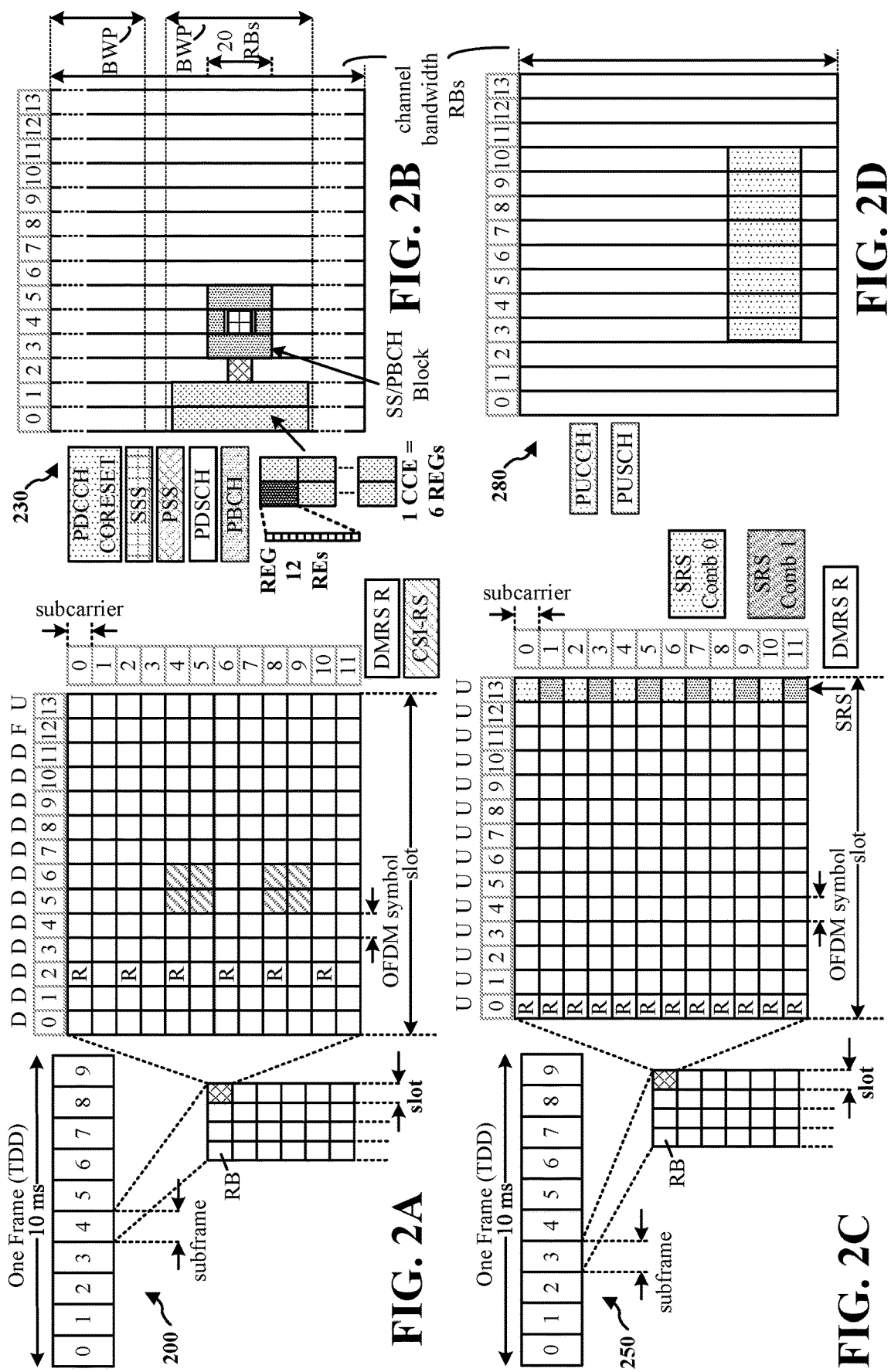
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f =$ $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
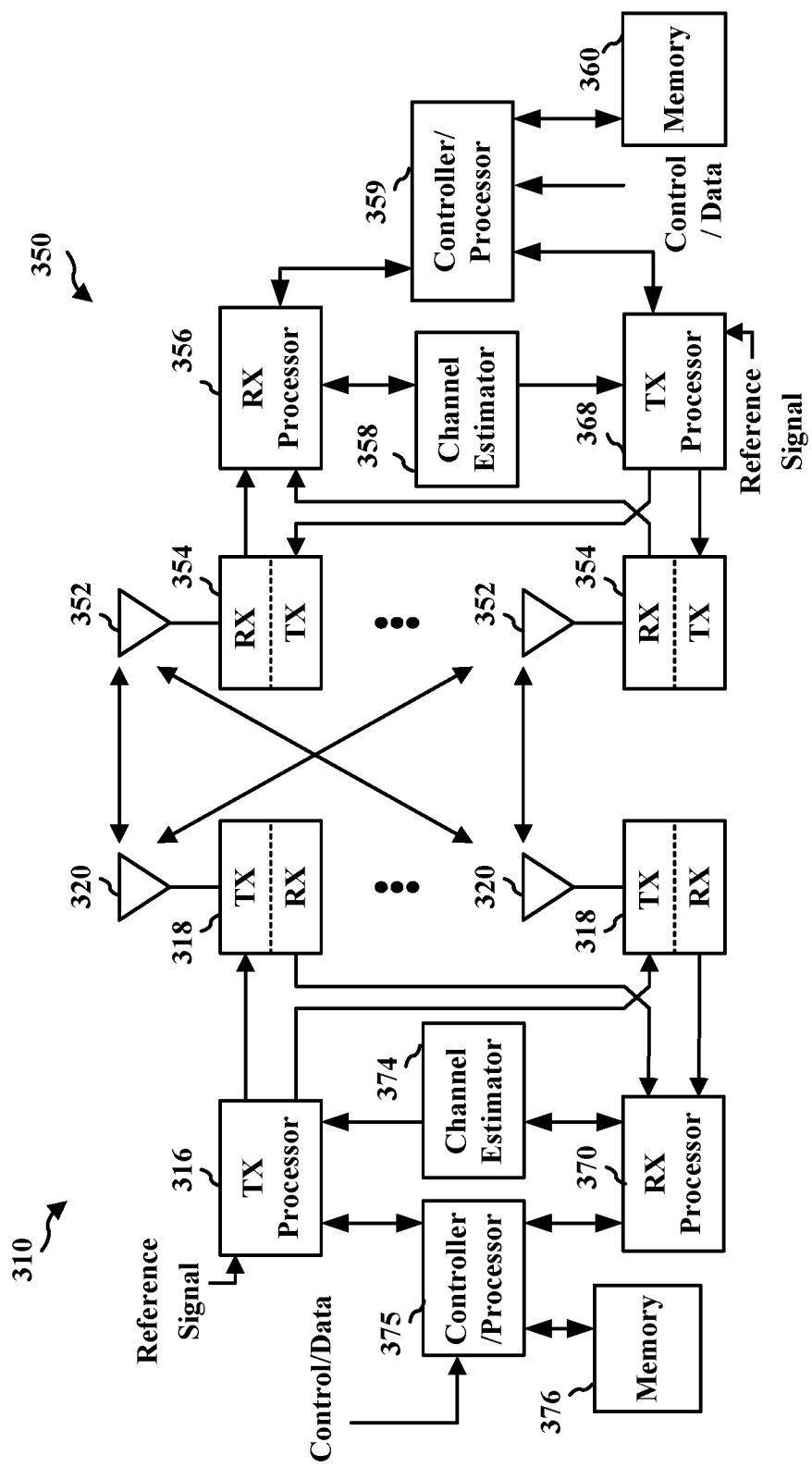
FIG. 3 is a diagram illustrating an example of a base station and user equipment (UE) in an access network.

FIG. 3 is a block diagram of a wireless device 310 in communication with a wireless device 350 in an access network. In some examples, the wireless device 310 may be a base station in communication with a UE (e.g., the device 350). In other examples, the wireless device 310 or 350 may be an IAB node. For example, the device 310 may be an IAB node and the device 350 may be a child node or a UE. In other examples, the wireless device 310 may be a base station, and the wireless device 350 may be an IAB node. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
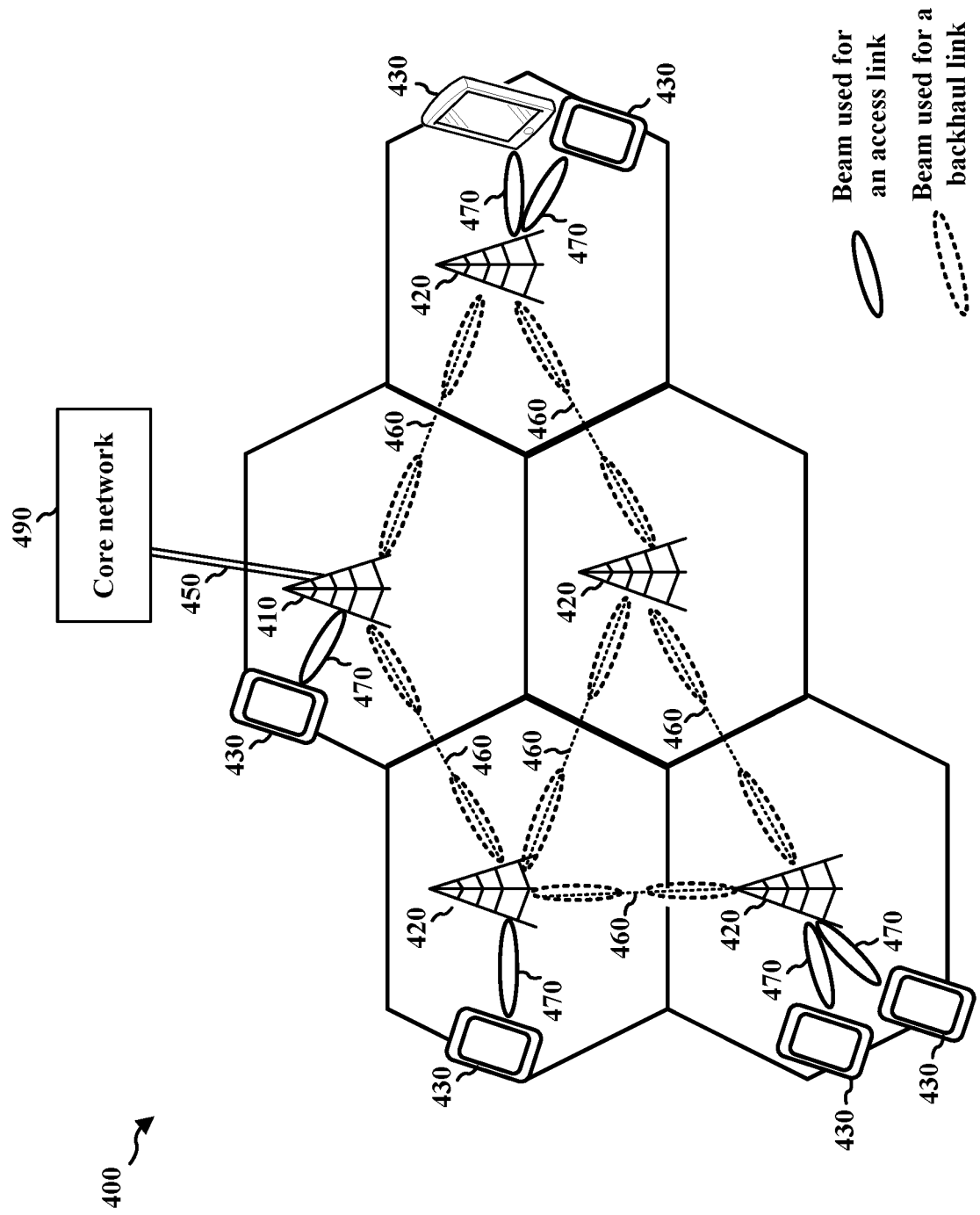
FIG. 4 is a diagram illustrating an example IAB network.

FIG. 4 is a diagram illustrating an IAB network 400. The IAB network 400 may include an anchor node (that may be referred to herein as an "IAB donor") 410 and access nodes (that may be referred to herein as "IAB nodes") 420. The IAB donor 410 may be a base station, such as a gNB or eNB, and may perform functions to control the IAB network 400. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450.

Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node. A network may have a limited number of available PCI values. For example, 5G NR systems may support 1008 PCI values. Accordingly, a given PCI value may be reused in the same network.

Figure 5:
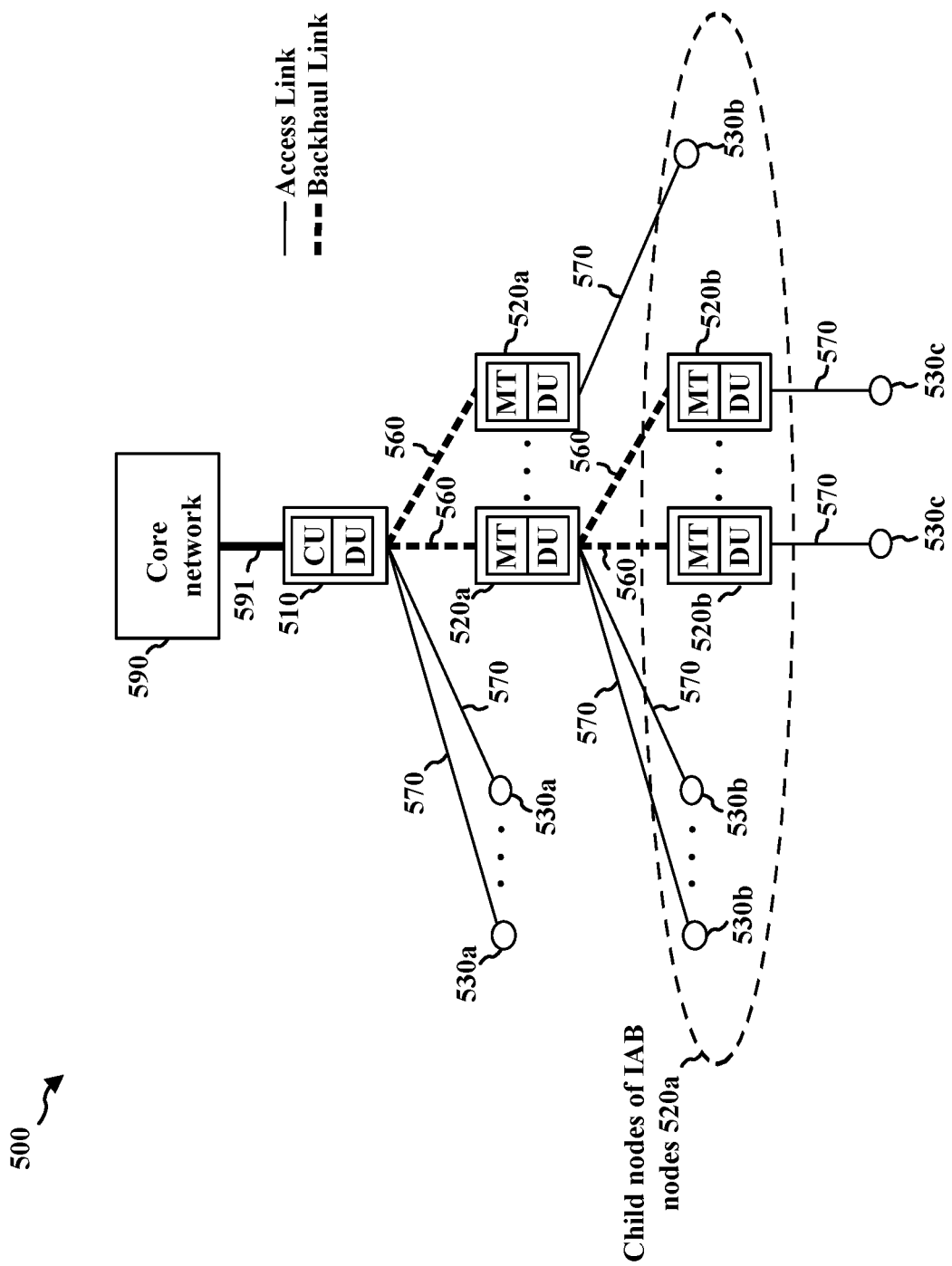
FIG. 5 is a diagram illustrating an example IAB network and components thereof.

FIG. 5 is a diagram illustrating an IAB network 500 and components thereof. The IAB network 500 includes an IAB donor 510 and IAB nodes 520a, 520b. The IAB nodes, as well as the IAB donor, may provide wireless access links to UEs 530a-c.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node. The pattern of a parent IAB node comprising a DU that schedules a child IAB node/child UE may continue to more connections that illustrated in FIG. 5.

In wireless communication systems that support full duplex (FD) communication, self-interference may be an issue that may affect FD communications. Self-interference may occur if a transmitted signal from a transmitting device is leaked to (e.g., received by) the transmitting device's own receive port. The transmitting device may cause interference to its own reception if transmission and reception overlap at least partially in time. In addition, the transmitted signal may be reflected by an object back to the receive port, which may be known as clutter echo. As used herein, a "clutter echo" refers to a signal transmitted by a device that is reflected by an object (referred to herein as a "clutter") and received by the device's own receiver. Reducing self-interference, especially clutter echo, via spatial isolation by properly choosing transmit and receive beams or more advanced transmit/ receive beamforming may assist in supporting FD communication. FD communication allows for simultaneous UL and DL transmission in FR2 and different associated aspects of procedures. Flexible TDD capability may be present at either a base station (e.g., gNB) or UE or both. For example, a UE in FD communication may transmit UL from one antenna panel and receive DL in another antenna panel. FD communication may be conditional on UL/DL beam separation. FD communication may result in a reduction of latency, such that it may be possible to receive a DL signal in UL only slots. At least another benefit is that FD communications may provide for a spectrum efficiency enhancement (e.g., per cell or per UE), which may allow for an increase in efficient resource utilization.

Self-interference measurements may be performed to determine whether FD capability may be supported or not, or may be enabled/enhanced at a wireless device. To perform self-interference measurements, the wireless device may send a signal from a first set of antennas on one or more transmit beam directions, and may measure the received signal (e.g., reflected back or leaked transmission signal) on a second set of antennas on one or more receive beam directions.

In some instances, a wireless device may receive a configuration to perform self-interference measurements from a network entity. The network entity may provide configurations/resources for the wireless device to perform the self-interference measurement. The network entity may configure the wireless device to provide reports of the self-interference measurements. The network entity, based on the received report of self-interference, may determine the wireless device's FD capability, conditions, and/or performance. However, the network entity may not account for clutter echo in configuring the wireless device to perform self-interference measurements.

In some instances, the wireless device may be configured to perform self-interference measurements without specific instructions from a network entity. For example, a network entity (e.g., a distributed unit (DU)) may send a downlink signal (e.g., SSB/CSI-RS), the wireless device may measure what is received, in terms of reference signal received power (RSRP), on its receive port/antennas. In another example, if a UE or a mobile termination (MT) is scheduled to send an uplink signal (e.g., SRS), the UE or MT may perform a self-interference measurement on its receive port/antennas. In some instances, the wireless device may not provide any reporting of the self-interference measurements to another entity (e.g., network). The wireless device may use the self-interference measurement to determine whether it may support FD or for beam tuning. However, the wireless device may not account for clutter echo while performing the self-interference measurement.

Figure 6B:
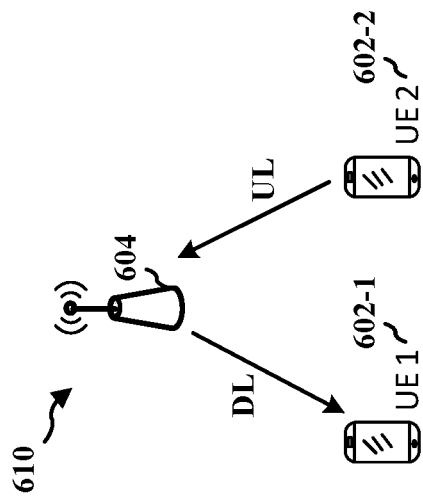
FIGS. 6A-6C are diagrams illustrating examples of full duplex communication.
Figure 6C:
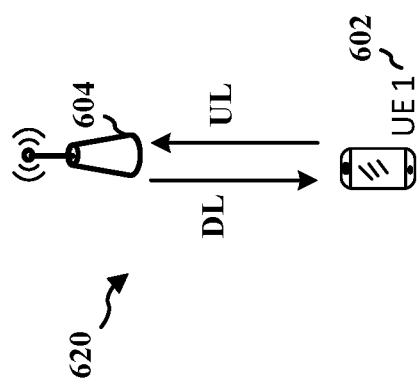
Figure 6A:
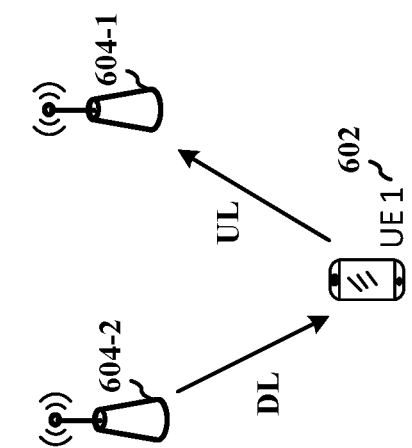

FIGS. 6A-6C are diagrams illustrating examples 600, 610, 620 of full duplex (FD) communication. The example 600 of FIG. 6A includes a UE1 602 and two base station (e.g., TRPs) 604-1, 604-2, wherein the UE1 602 is sending uplink transmissions to base station 604-1 and is receiving downlink transmissions from base station 604-2, e.g., in a simultaneous manner that overlaps in time. In some aspects, 604-1 and 604-2 or 604 may represent IAB nodes. In the example 600 of FIG. 6A, FD is enabled for the UE1 602, but not for the base stations 604-1, 604-2. The example 610 of FIG. 6B includes two UEs, UE1 602-1 and UE2 602-2 and a base station 604, wherein the UE1 602-1 is receiving a downlink transmission from the base station 604 and the UE2 602-2 is transmitting an uplink transmission to the base station 604. In the example 610 of FIG. 6B, FD is enabled for the base station 604, but not for the UEs UE1 602-1 and UE2 602-2. The example 620 of FIG. 6C include s a UE1 602 and a base station 604, wherein the UE1 602 is receiving a downlink transmission from the base station 604 and the UE1 602 is transmitting an uplink transmission to the base station 604. In the example 620 of FIG. 6C, FD is enabled for both the UE1 602 and the base station 604.

The present disclosure relates to improving the manner in which self-interference measurement may be configured specific for clutter echo detection with power ramping. A self-interference measurement configuration may be adjusted in response to detected clutter echo. For example, a wireless device may be configured to perform multiple iterations of SIM while increasing the power with each SIM iteration to detect clutter echo, until reaching the full transmission power, and may report such results to a network entity, such that the network entity may adjust the self-interference configuration. Configuring the self-interference measurement to account for detected clutter echo may assist in performing self-interference measurements and beam pair selection. As such, improving the manner in which a self-interference measurement is configured to allow for the detection of clutter echo is desirable.

Beam separation of the transmit and receive beams assist in limiting or reducing self-interference that may occur during FD communication. It is desirable to account for clutter echo when configuring self-interference measurements to minimize self-interference and decide on the selection of DL and UL beam pair. Determining whether clutter echo is present may allow for the self-interference measurement configuration to be adjusted, which may provide a reliable FD communication by selecting beam pairs that minimize or reduce self-interference.

Figure 7:
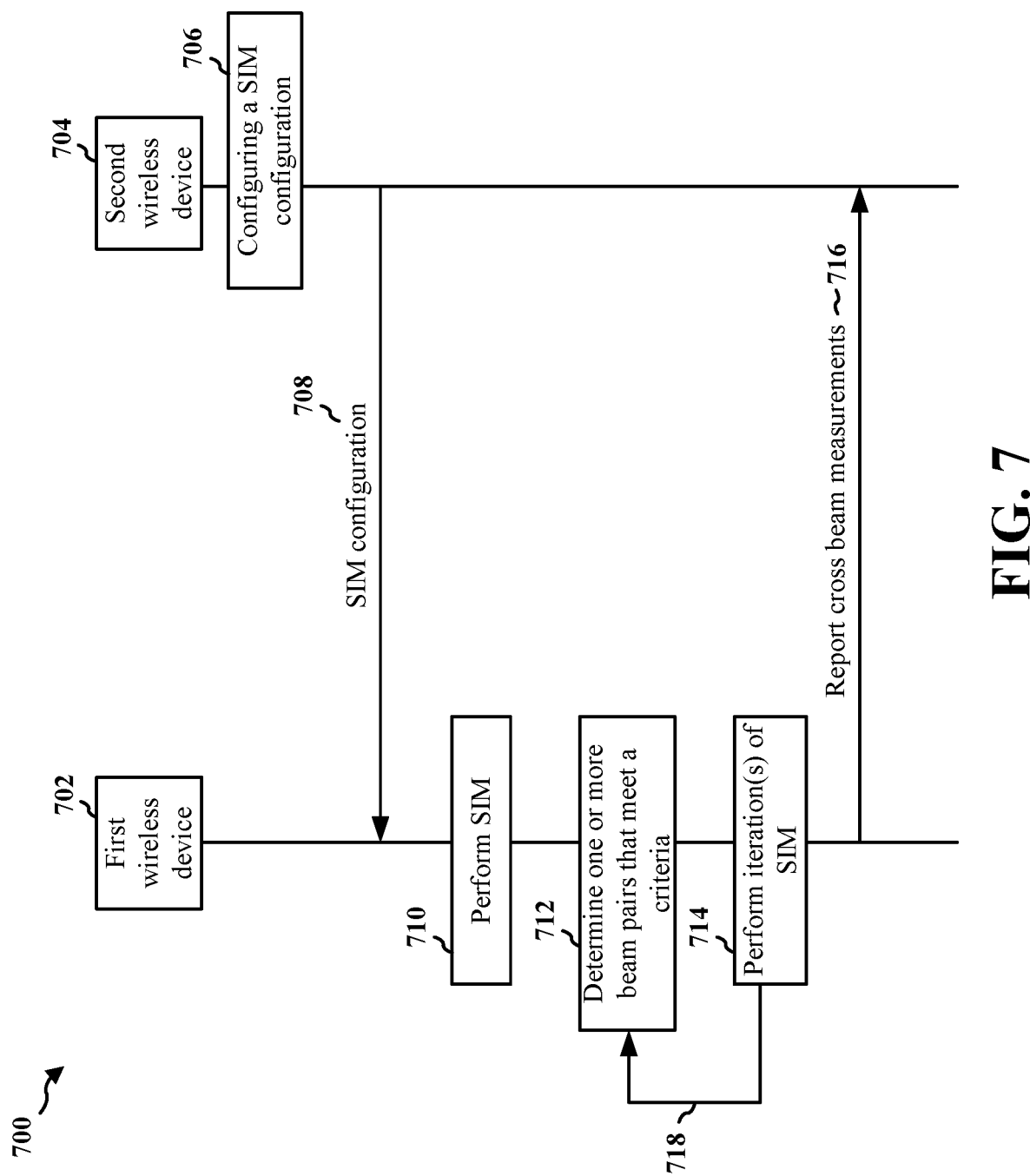
FIG. 7 is a call flow diagram of signaling between a first wireless device and a second wireless device in accordance with certain aspects of the disclosure.

FIG. 7 is a call flow diagram 700 between a first wireless device 702 and a second wireless device 704. In some aspects, the first wireless device 702 may be a UE and the second wireless device 704 may be a base station, where the base station provides a cell serving the UE. For example, in the context of FIG. 1, the second wireless device 704 may correspond to the base station 102/180 and, accordingly, the cell may include a geographic coverage area 110 in which communication coverage is provided and/or small cell 102' having a coverage area 110'. Further, the first wireless device 702 may correspond to at least UE 104. In another example, in the context of FIG. 3, the second wireless device 704 may correspond to the device 310, and the first wireless device 702 may correspond to the device 350.

As illustrated at 706, the second wireless device 704 may configure a SIM configuration for multiple beam pairs. The second wireless device 704 may configure the SIM configuration for multiple beam pairs based on a first transmission power. In some aspects, the first wireless device 702 may be a UE, an IAB node, or a child node. In some aspects, the second wireless device 704 may be a base station or an IAB node.

The first wireless device 702 may perform a SIM with a first transmission power based on a first SIM configuration. In some examples, the SIM may be an initial SIM that is performed using a smaller, e.g., initial, transmission power. The SIM may be performed at 710 in an autonomous manner, e.g., the first wireless device 702 may determine to perform the SIM without receiving instructions to perform the SIM from the second wireless device. In some aspects, the first wireless device 702 may be configured to perform the SIM based on a SIM configuration received from the second wireless device 704. For example, a UE or an IAB node may perform a SIM based on a configuration configured and provided by the network.

As illustrated at 708, the second wireless device 704 may transmit the SIM configuration to the first wireless device 702. The first wireless device 702 receives the SIM configuration from the second wireless device 704. The configuration may indicate various parameters for the SIM, including, among others, a time window for performing the SIM or time and/or frequency resources for reporting SIM measurements to the second wireless device, or more specific TX and RX beam sweep resources.

As illustrated at 710, the first wireless device 702 may perform a SIM for multiple beam pairs. The first wireless device 702 may perform the SIM for multiple beam pairs based on a first transmission power. In some aspects, an initial SIM may utilize a small transmission power. The transmission power may be configured in a first SIM configuration from the second wireless device 704. In some aspects, the transmission power for the initial SIM may be determined by the first wireless device without a configuration from the second wireless device. In some aspects, the transmission power for the initial SIM may be pre-defined by the first wireless device 702 or the second wireless device 704. In some aspects, the first wireless device 702 may be a UE, an IAB node, or a child node. In some aspects, the second wireless 704 device may be a base station, an IAB node, or a parent node.

As illustrated at 712, the first wireless device may determine one or more beam pairs, for which the SIM was performed, meet a criteria. In some aspects, the criteria may correspond to a measured cross beam self-interference RSRP being less than a threshold. In some aspects, the criteria may correspond to a detected clutter echo self-interference, e.g., cross beam self-interference RSRP being less than a noise floor. In some aspects, the criteria may correspond to a measured round trip time (RTT) that is larger than a threshold. In instances where none of the beam pairs meet the criteria, the first wireless device 702 may, at 716, report the measurements that no clutter echo is detected. In instances where one or more of the beams pairs meet the criteria, the first wireless device 702 may perform another iteration of the SIM using power ramping. The iteration may be performed for a subset or reduced set of beam pairs, e.g., being limited to the one or more beam pairs that meet the criteria. In some aspects, the first wireless device 702 may perform a second SIM using a second transmission power larger than the first transmission power. In some aspects, the first wireless device 702 may perform a third SIM using a third transmission power larger than the second transmission power. The first wireless device 702 may continue to perform additional SIM until reaching a maximum number of iterations or reaches the full transmission power.

As illustrated at 714, the first wireless device may perform an iteration of the SIM for the one or more beam pairs. The first wireless device may perform the iteration of the SIM for the one or more beam pairs that meet the criteria. The iteration of the SIM may be based on a second transmission power. The second transmission power may be greater than the first transmission power.

As illustrated at 716, the first wireless device 702 may report cross beam measurements. The first wireless device 702 may report the cross beam measurements for the top beam pair candidates. The top beam pair candidate may be based on the cross beam measurements. The first wireless device 702 may report the cross beam measurements for the top beam pair candidates having the highest cross beam measurements. The first wireless device may report cross beam measurement for the top beam pair candidates and the one or more beam pairs that meet the criteria based on the SIM performed with the first transmission power. In some aspects, the cross beam measurements may include one or more of a cross beam RSRP or a cross beam signal to interference plus noise ratio (SINR). The second wireless device 704 may receive the cross beam measurements from the first wireless device 702.

As described, in some aspects, if one or more beam pairs meets the criteria, then the transmission power for the beam pairs that meet the criteria may be increased in a next round of SIM.

In some aspects, the first wireless device 702 may receive a second SIM configuration from a second wireless device. The second SIM configuration may be based on at least the cross beam measurement report. The SIM may be performed by the first wireless device with the second transmission power based on the second SIM configuration. In some aspects, the SIM may be performed for the beam pairs that meet the criteria and have a transmission power increased.

In some aspects, to determine if the criteria has been met, such decision may be based on the measured cross beam (e.g., transmit beam to receive beam) self-interference RSRP being less than a threshold. In such instances, the transmission power may be increased in the next round or iteration of SIM. The reported RSRP values may be less than a small threshold (e.g., noise floor). In some aspects, to determine if the criteria has been met, such decision may be based on the detected clutter echo self-interference which may be based on a threshold on measured RTT. In such instances, the transmission power may be increased or full transmission power may be used on the next round or iteration of SIM.

In some aspects, the first wireless device 702 may repeat one or more additional iterations of the SIM based on an increased transmission power per iteration. After performing the second round of SIM for the reduced set of beam pairs that met the criteria, the first wireless device may determine whether the second round of SIM provides measurements that meet the criteria for one or more beam pairs. If so, the first wireless device 702 may perform another iteration of the SIM with power ramping, wherein the power is increased per iteration with respect to the previous transmission power. The first wireless device 702 may increase the transmission power for the SIM and may perform another set of SIM measurements for the beams that met the criteria after the second round of SIM. The first wireless device 702 may continue to repeat one or more additional iterations of the SIM until reaching a threshold number of iteration or until reaching a full transmit power of the first wireless device. For example, the line 718 in FIG. 7 may illustrate the multiple iterations of the SIM that may be performed for one or more beam pairs that meet the criteria, at 712, based on the latest iteration of SIM. Thus, a respective iteration may be performed by the first wireless device for a subset of beam pairs that meet the criteria based on measurements performed in a prior iteration.

In some aspects, the first wireless device may repeat the one or more additional iterations until reaching a threshold number of iterations or reaching a full transmit power of the first wireless device. In some aspects, the threshold number of iterations may be determined by the first wireless device. The first wireless device 702 may repeat the one or more additional iterations of the SIM until reaching the full transmission power or clutter has been detected or measured for the one or more beam pairs. In some aspects, the number of rounds or iterations of SIM may be determined by the first wireless device or the second wireless device.

In some aspects, the first wireless device 702 may receive an indication of the threshold number of iterations. The first wireless device 702 may receive the threshold number of iterations in a configuration from the second wireless device 704. For example, the threshold number of iterations may be included in the SIM configuration received from the second wireless device 704.

Figure 8:
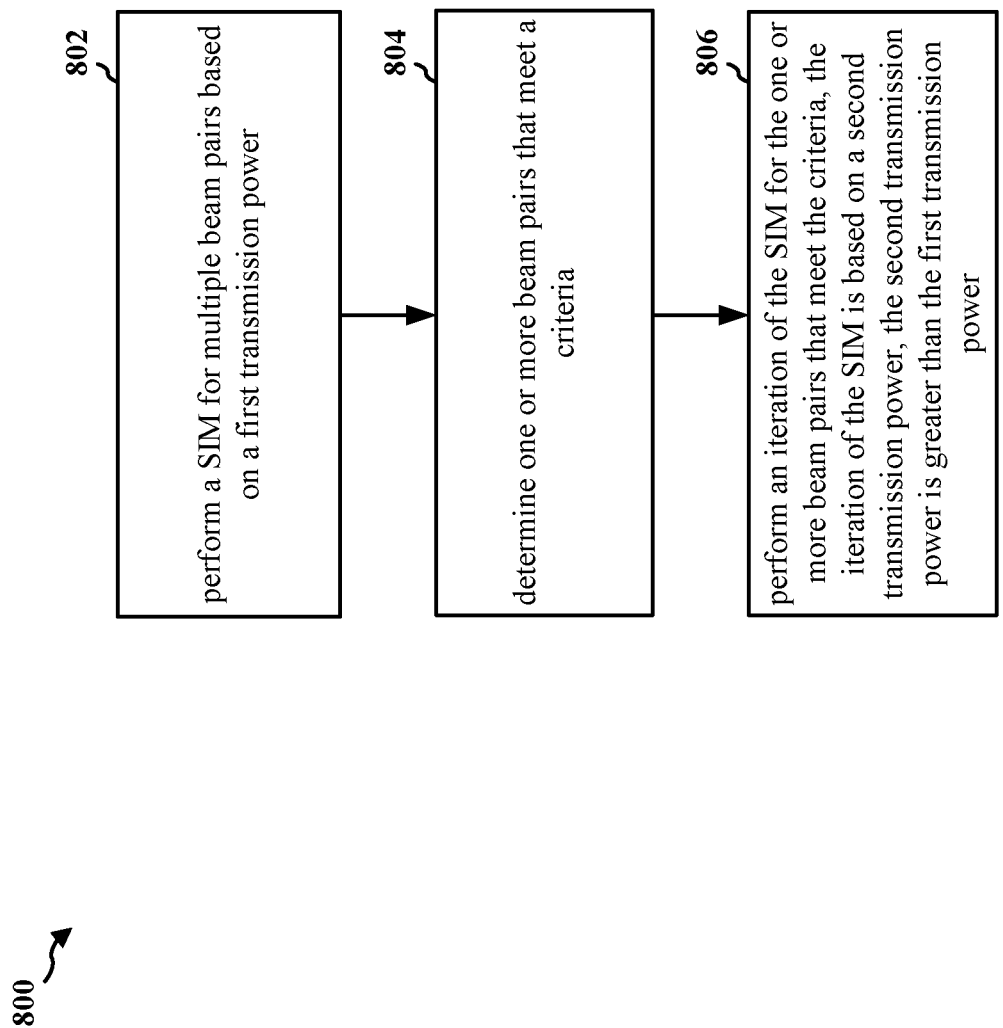
FIG. 8 is a flowchart of a method of wireless communication.

FIG. 8 is a flowchart 800 of a method of wireless communication. The method may be performed by an IAB node or a UE or a component of an IAB node or a UE (e.g., the IAB node 103, 410, 420, 510, 520a, 520b; the device 350, 702, 704, 802, 804; the UE 104, 430, 602; the apparatus 1002; the cellular baseband processor 1004, which may include the memory 360 and which may be the entire device 350 or a component of the device 350, such as the TX processor 368, the RX processor 356, and/or the controller/processor 359). One or more of the illustrated operations may be optional, omitted, transposed, or contemporaneous. The method may enable a first wireless device to perform iterations of SIM to detect clutter echo.

At 802, the first wireless device may perform a SIM. For example, 802 may be performed by SIM component 1042 of apparatus 1002. The first wireless device may perform the SIM for multiple beam pairs. The first wireless device may perform the SIM for multiple beam pairs based on a first transmission power. In some aspects, the first wireless device may comprise a UE, an IAB node, or a child node.

At 804, the first wireless device may determine one or more beam pairs that meet a criteria. For example, 804 may be performed by determination component 1044 of apparatus 1002. In some aspects, the criteria may correspond to a measured cross beam self-interference RSRP being less than a threshold. In some aspects, the criteria may correspond to a detected clutter echo self-interference. In some aspects, the criteria may correspond to a measured RTT that is larger than a threshold.

At 806, the first wireless device may perform an iteration of the SIM for the one or more beam pairs that meet the criteria. For example, 806 may be performed by iteration component 1046 of apparatus 1002. The iteration of the SIM may be based on a second transmission power. The second transmission power may be greater than the first transmission power. The first transmission power may precede the second transmission power. For example, an increase in the transmission power may occur per iteration with respect to the previous transmission power setting. In some aspects, if additional iterations of the SIM are performed, then an increased transmission power may be used that is increased from the second or prior transmission power. As such, the transmission power may be increased with respect to a previous transmission power setting when one or more iterations of the SIM are performed.

Figure 9:
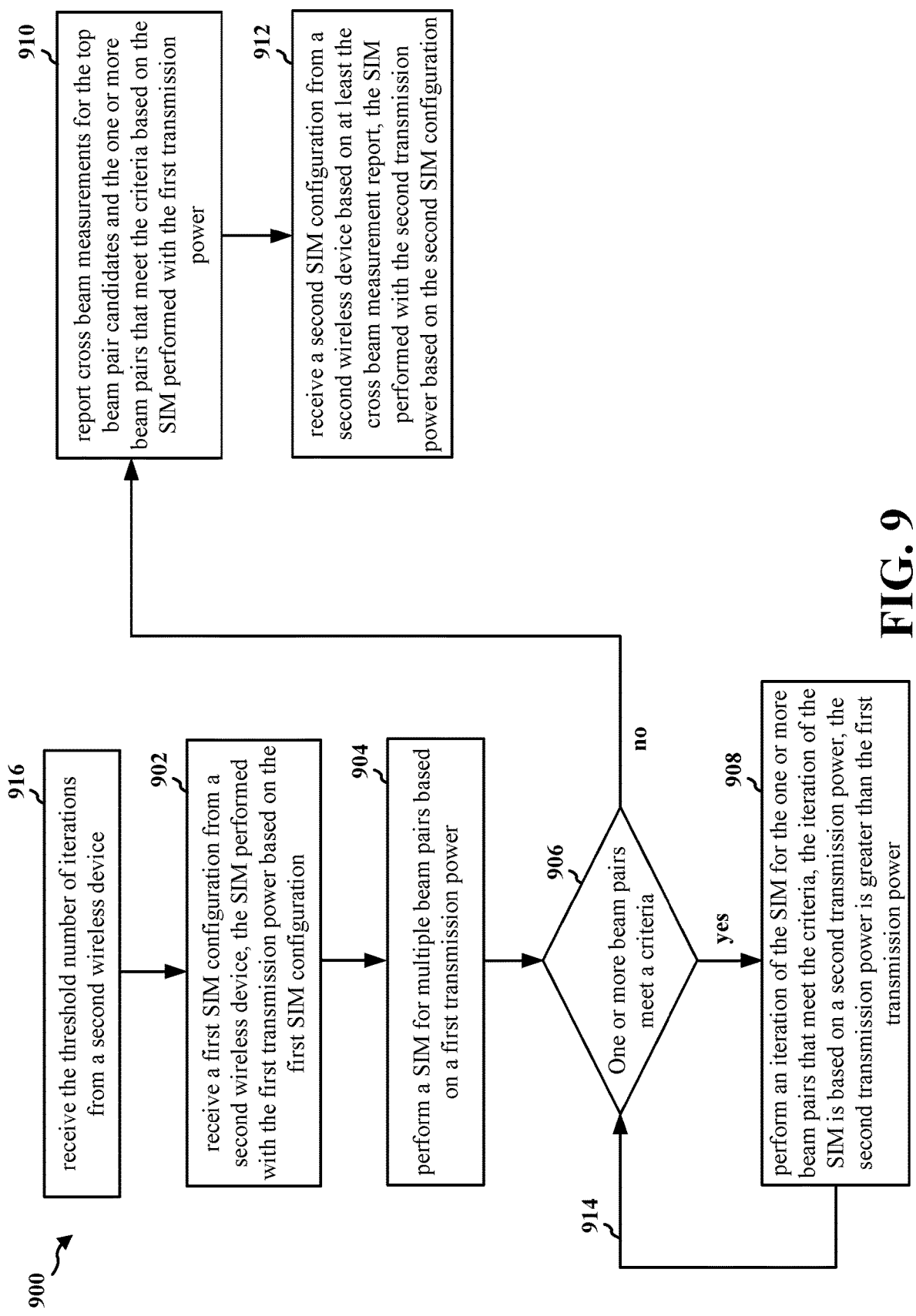
FIG. 9 is a flowchart of a method of wireless communication.

FIG. 9 is a flowchart 900 of a method of wireless communication. The method may be performed by an IAB node or a UE or a component of an IAB node or a UE (e.g., the IAB node 103, 410, 420, 510, 520a, 520b; the device 350, 702, 704, 802, 804; the UE 104, 430, 602; the apparatus 1002; the cellular baseband processor 1004, which may include the memory 360 and which may be the entire device 350 or a component of the device 350, such as the TX processor 368, the RX processor 356, and/or the controller/processor 359). One or more of the illustrated operations may be optional, omitted, transposed, or contemporaneous. The method may enable a first wireless device to perform iterations of SIM to detect clutter echo.

At 902, the first wireless device may receive a first SIM configuration. For example, 902 may be performed by first SIM component 1040 of apparatus 1002. The first wireless device may receive the first SIM configuration from a second wireless device. The first wireless device may perform a SIM with a first transmission power based on the first SIM configuration.

At 904, the first wireless device may perform a SIM for multiple beam pairs. For example, 904 may be performed by SIM component 1042 of apparatus 1002. The first wireless device may perform the SIM for multiple beam pairs based on a first transmission power. In some aspects, the first wireless device may comprise a UE, an IAB node, or a child node.

At 906, the first wireless device may determine one or more beam pairs that meet a criteria. For example, 906 may be performed by determination component 1044 of apparatus 1002. In some aspects, the criteria may correspond to a measured cross beam self-interference RSRP being less than a threshold. In some aspects, the criteria may correspond to a detected clutter echo self-interference. In some aspects, the criteria may correspond to a measured RTT that is larger than a threshold.

At 908, the first wireless device may perform an iteration of the SIM. For example, 908 may be performed by iteration component 1046 of apparatus 1002. The first wireless device may perform the iteration of the SIM for the one or more beam pairs that meet the criteria. The iteration of the SIM may be based on a second transmission power. The second transmission power may be greater than the first transmission power. The first transmission power may precede the second transmission power. For example, an increase in the transmission power may occur per iteration with respect to the previous transmission power setting. In some aspects, if additional iterations of the SIM are performed, then an increased transmission power may be used that is increased from the second or prior transmission power. As such, the transmission power may be increased with respect to a previous transmission power setting when one or more iterations of the SIM are performed.

At 910, the first wireless device may report cross beam measurements. For example, 910 may be performed by report component 1048 of apparatus 1002. The first wireless device may report the cross beam measurements for the top beam pair candidates having the highest cross beam measurements. The first wireless device may report cross beam measurement for the top beam pair candidates and the one or more beam pairs that meet the criteria based on the SIM performed with the first transmission power. In some aspects, the cross beam measurements may include one or more of a cross beam RSRP or a cross beam SINR.

At 912, the first wireless device may receive a second SIM configuration. For example, 912 may be performed by second SIM component 1050 of apparatus 1002. The first wireless device may receive the second SIM configuration from a second wireless device. The second SIM configuration may be based on at least the cross beam measurement report. The SIM may be performed by the first wireless device with the second transmission power based on the second SIM configuration.

At 914, the first wireless device may repeat one or more additional iterations of the SIM. For example, 914 may be performed by repeat component 1052 of apparatus 1002. The first wireless device may repeat one or more additional iterations of the SIM based on an increased transmission power per iteration. A respective iteration may be performed by the first wireless device for a subset of beam pairs that meet the criteria based on measurements performed in a prior iteration. In some aspects, the first wireless device may repeat the one or more additional iterations until reaching a threshold number of iterations or reaching a full transmit power of the first wireless device. In some aspects, the threshold number of iterations may be determined by the first wireless device.

At 916, the first wireless device may receive an indication of the threshold number of iterations. For example, 916 may be performed by threshold component 1054 of apparats 1002. The first wireless device may receive the indication of the threshold number of iterations from the second wireless device. The first wireless device may perform the one or more additional iterations of the SIM based on the indication of the threshold number of iterations.

Figure 10:
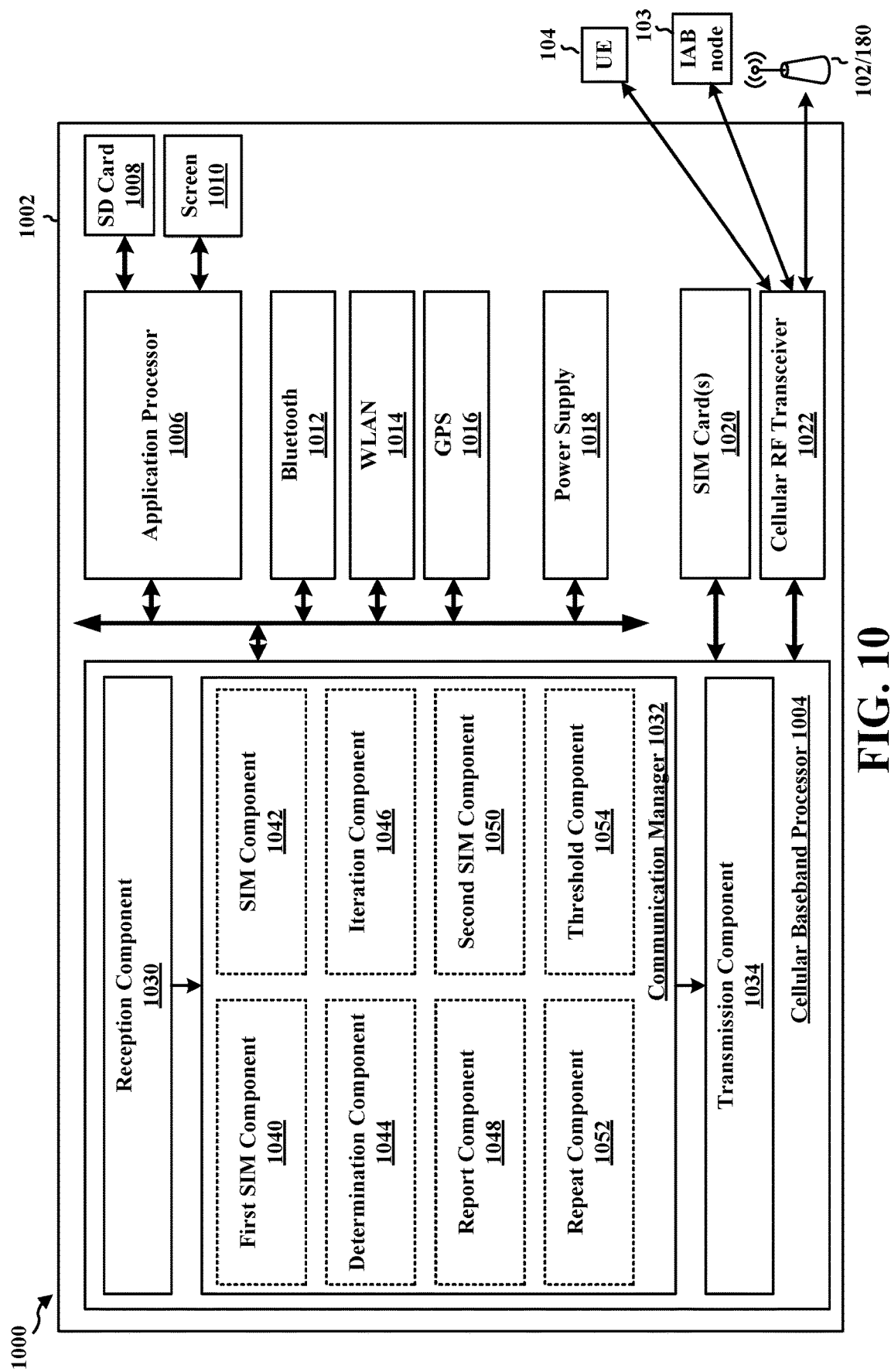
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the device 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a first SIM component 1040 that is configured to receive a first SIM configuration from a second wireless device, e.g., as described in connection with 902 of FIG. 9. The communication manager 1032 further includes a SIM component 1042 that is configured to perform a SIM for multiple beam pairs, e.g., as described in connection with 802 of FIG. 8 or 904 of FIG. 9. The communication manager 1032 further includes a determination component 1044 that is configured determine one or more beam pairs that meet a criteria, e.g., as described in connection with 804 of FIG. 8 or 906 of FIG. 9. The communication manager 1032 further includes an iteration component 1046 that is configured to perform an iteration of the SIM for the one or more beam pairs that meet the criteria, e.g., as described in connection with 806 of FIG. 8 or 908 of FIG. 9. The communication manager 1032 further includes a report component 1048 that is configured to report cross beam measurements for the top beam pair candidates, e.g., as described in connection with 910 of FIG. 9. The communication manager 1032 further includes a second SIM component 1050 that is configured to receive a second SIM configuration from a second wireless device, e.g., as described in connection with 912 of FIG. 9. The communication manager 1032 further includes a repeat component 1052 that is configured to repeat one or more additional iterations of the SIM, e.g., as described in connection with 914 of FIG. 9. The communication manager 1032 further includes a threshold component 1054 that is configured to receive a threshold number of iterations, e.g., as described in connection with 916 of FIG. 9.

The apparatus may include additional components that perform each of the blocks of the algorithm in the flowcharts of FIG. 8 or 9. As such, each block in the flowcharts of FIG. 8 or 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for performing a self-interference measurement (SIM) for multiple beam pairs based on a first transmission power. The apparatus includes means for determining one or more beam pairs that meet a criteria. The apparatus includes means for performing an iteration of the SIM for the one or more beam pairs that meet the criteria. The iteration of the SIM is based on a second transmission power that is increased from the first transmission power. The apparatus further includes means for receiving a first SIM configuration from a second wireless device, wherein the SIM is performed with the first transmission power based on the first SIM configuration. The apparatus further includes means for reporting cross beam measurements for the top beam pair candidates and the one or more beam pairs that meet the criteria based on the SIM performed with the first transmission power. The apparatus further includes means for receiving a second SIM configuration from a second wireless device based on at least the cross beam measurement report, wherein the SIM is performed with the second transmission power based on the second SIM configuration. The apparatus further includes means for repeating one or more additional iterations of the SIM based on an increased transmission power. A respective iteration is performed for a subset of beam pairs that meet the criteria based on measurements performed in a prior iteration. The apparatus further include s means for receiving the threshold number of iterations from a second wireless device. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
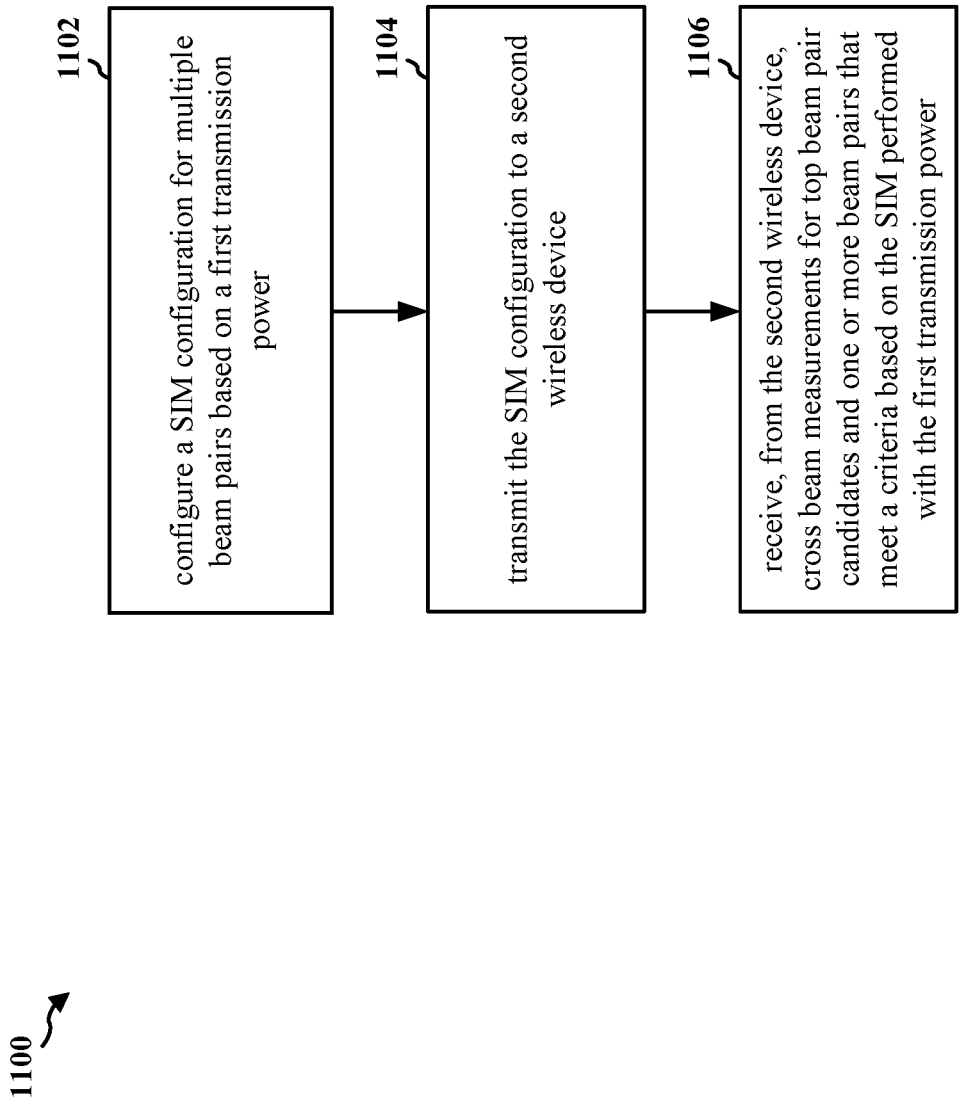
FIG. 11 is a flowchart of a method of wireless communication.

FIG. 11 is a flowchart 1100 of a method of wireless communication. The method may be performed by an IAB node or a base station or a component of an IAB node or a base station (e.g., the IAB node 103, 410, 420, 510, 520a, 520b; the base station 102, 180, 604, 604-1, 604-2; the device 310, 704, 804; the apparatus 1302; the baseband unit 1304, which may include the memory 376 and which may be the entire device 310 or a component of the device 310, such as the TX processor 316, the RX processor 370, and/or the controller/processor 375). One or more of the illustrated operations may be optional, omitted, transposed, or contemporaneous. The method may enable a first wireless device to configure a second wireless device to perform iterations of SIM to detect clutter echo.

At 1102, the first wireless device may configure a SIM configuration. For example, 1102 may be performed by configuration component 1340 of apparatus 1302. The first wireless device may configure the SIM configuration for multiple beam pairs. The first wireless device may configure the SIM configuration for multiple beam pairs based on a first transmission power. In some aspects, the first wireless device may be a base station, an IAB node, or a parent node.

At 1104, the first wireless device may transmit the SIM configuration. For example, 1104 may be performed by SIM component 1342 of apparatus 1302. The first wireless device may transmit the SIM configuration to a second wireless device. The SIM configuration may configure the second wireless device to perform SIM. In some aspects, the second wireless device may comprise a UE, an IAB node, or a child node.

At 1106, the first wireless device may receive cross beam measurements for top beam pair candidates. For example, 1106 may be performed by cross beam component 1346 of apparatus 1302. The first wireless device may receive, from the second wireless device, cross beam measurements for top beam pair candidates and one or more beam pairs that meet a criteria based on the SIM performed with the first transmission power. In some aspects, the criteria may correspond to a measured cross beam self-interference RSRP being less than a threshold. In some aspects, the criteria may correspond to a detected clutter echo self-interference. In some aspects, the criteria may correspond to a measured round trip time (RTT) that is larger than a threshold. In some aspects, the cross beam measurements may include one or more of a cross beam RSRP or a cross beam SINR. In some aspects, the second wireless device may repeat one or more additional iterations of the SIM based on an increased transmission power. A respective iteration may be performed for a subset of beam pairs that meet the criteria based on measurements performed in a prior iteration. The second wireless device may repeat the one or more additional iterations until reaching a threshold number of iterations or reaching a full transmit power of the second wireless device.

Figure 12:
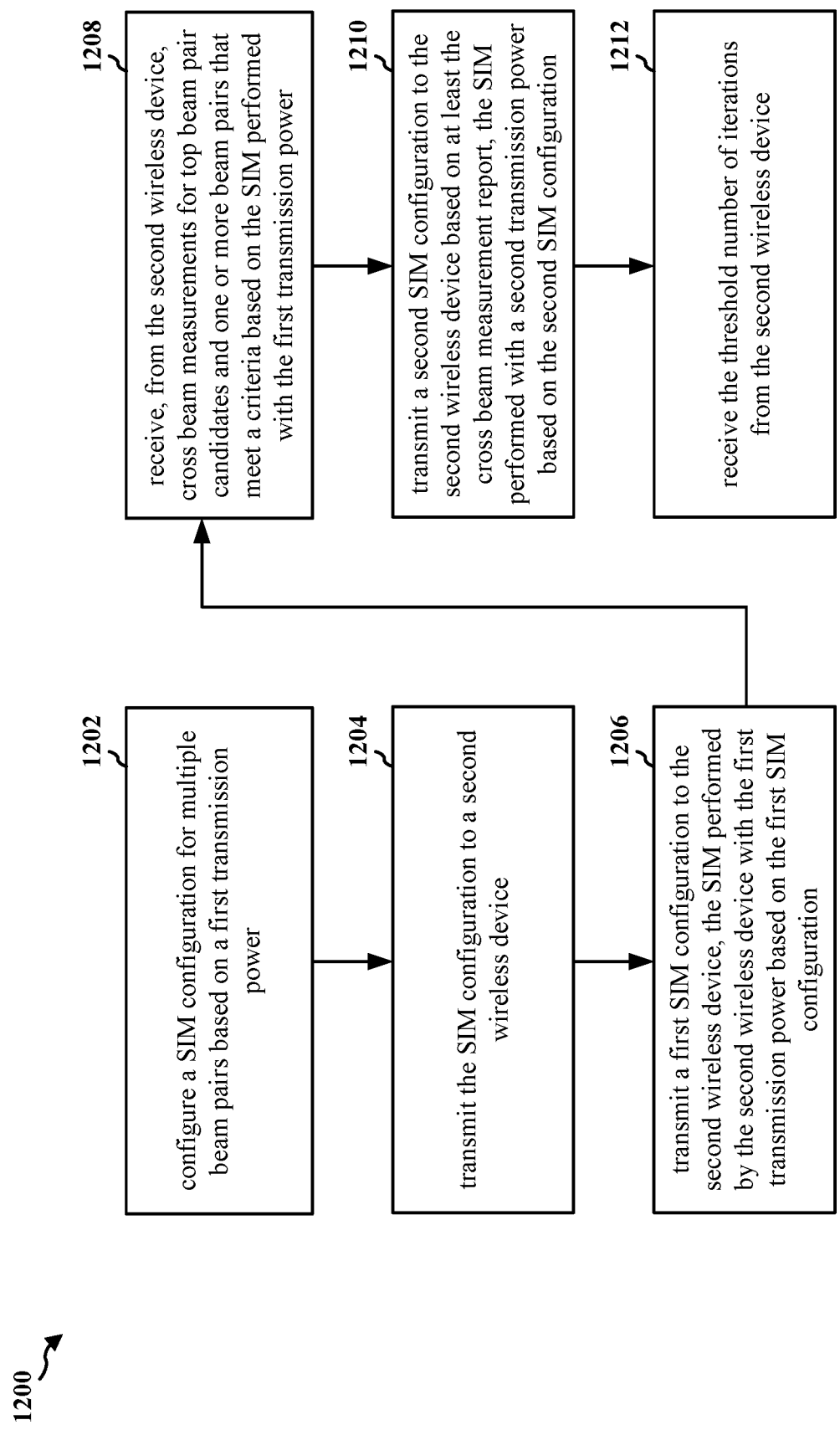
FIG. 12 is a flowchart of a method of wireless communication.

FIG. 12 is a flowchart 1200 of a method of wireless communication. The method may be performed by an IAB node or a base station or a component of an IAB node or a base station (e.g., the IAB node 103, 410, 420, 510, 520a, 520b; the base station 102, 180, 604, 604-1, 604-2; the device 310, 704, 804; the apparatus 1302; the baseband unit 1304, which may include the memory 376 and which may be the entire device 310 or a component of the device 310, such as the TX processor 316, the RX processor 370, and/or the controller/processor 375). One or more of the illustrated operations may be optional, omitted, transposed, or contemporaneous. The method may enable a first wireless device to configure a second wireless device to perform iterations of SIM to detect clutter echo.

At 1202, the first wireless device may configure a SIM configuration. For example, 1202 may be performed by configuration component 1340 of apparatus 1302. The first wireless device may configure the SIM configuration for multiple beam pairs. The first wireless device may configure the SIM configuration for multiple beam pairs based on a first transmission power. In some aspects, the first wireless device may be a base station, an IAB node, or a parent node.

At 1204, the first wireless device may transmit the SIM configuration. For example, 1204 may be performed by SIM component 1342 of apparatus 1302. The first wireless device may transmit the SIM configuration to a second wireless device. The SIM configuration may configure the second wireless device to perform SIM. In some aspects, the second wireless device may comprise a UE, an IAB node, or a child node.

At 1206, the first wireless device may transmit a first SIM configuration. For example, 1206 may be performed by first SIM component 1344 of apparatus 1302. The first wireless device may transmit the first SIM configuration to the second wireless device. The SIM may be performed by the second wireless device with the first transmission power based on the first SIM configuration.

At 1208, the first wireless device may receive cross beam measurements for top beam pair candidates. For example, 1208 may be performed by cross beam component 1346 of apparatus 1302. The first wireless device may receive the cross beam measurements for the top beam pair candidates from the second wireless device. The first wireless device may receive the cross beam measurements for top beam pair candidates and one or more beam pairs that meet a criteria based on the SIM performed with the first transmission power. In some aspects, the criteria correspond to a measured cross beam self-interference RSRP being less than a threshold. In some aspects, the criteria correspond to a detected clutter echo self-interference. In some aspects, the criteria correspond to a measured round trip time (RTT) that is larger than a threshold. In some aspects, the cross beam measurements may include one or more of a cross beam RSRP or a cross beam SINR. In some aspects, the second wireless device may repeat one or more additional iterations of the SIM based on an increased transmission power. A respective iteration may be performed for a subset of beam pairs that meet the criteria based on measurements performed in a prior iteration. The second wireless device may repeat the one or more additional iterations until reaching a threshold number of iterations or reaching a full transmit power of the second wireless device.

At 1210, the first wireless device may transmit a second SIM configuration. For example, 1210 may be performed by second SIM component 1348 of apparatus 1302. The first wireless device may transmit the second SIM configuration to the second wireless device. The first wireless device may transmit the second SIM configuration to the second wireless device based on at least the cross beam measurement report. The SIM may be performed with a second transmission power based on the second SIM configuration.

At 1212, the first wireless device may receive the threshold number of iterations. For example, 1212 may be performed by threshold component 1350 of apparatus 1302. The first wireless device may receive the threshold number of iterations from the second wireless device. In some aspects, the threshold number of iterations may be determined by the first wireless device.

Figure 13:
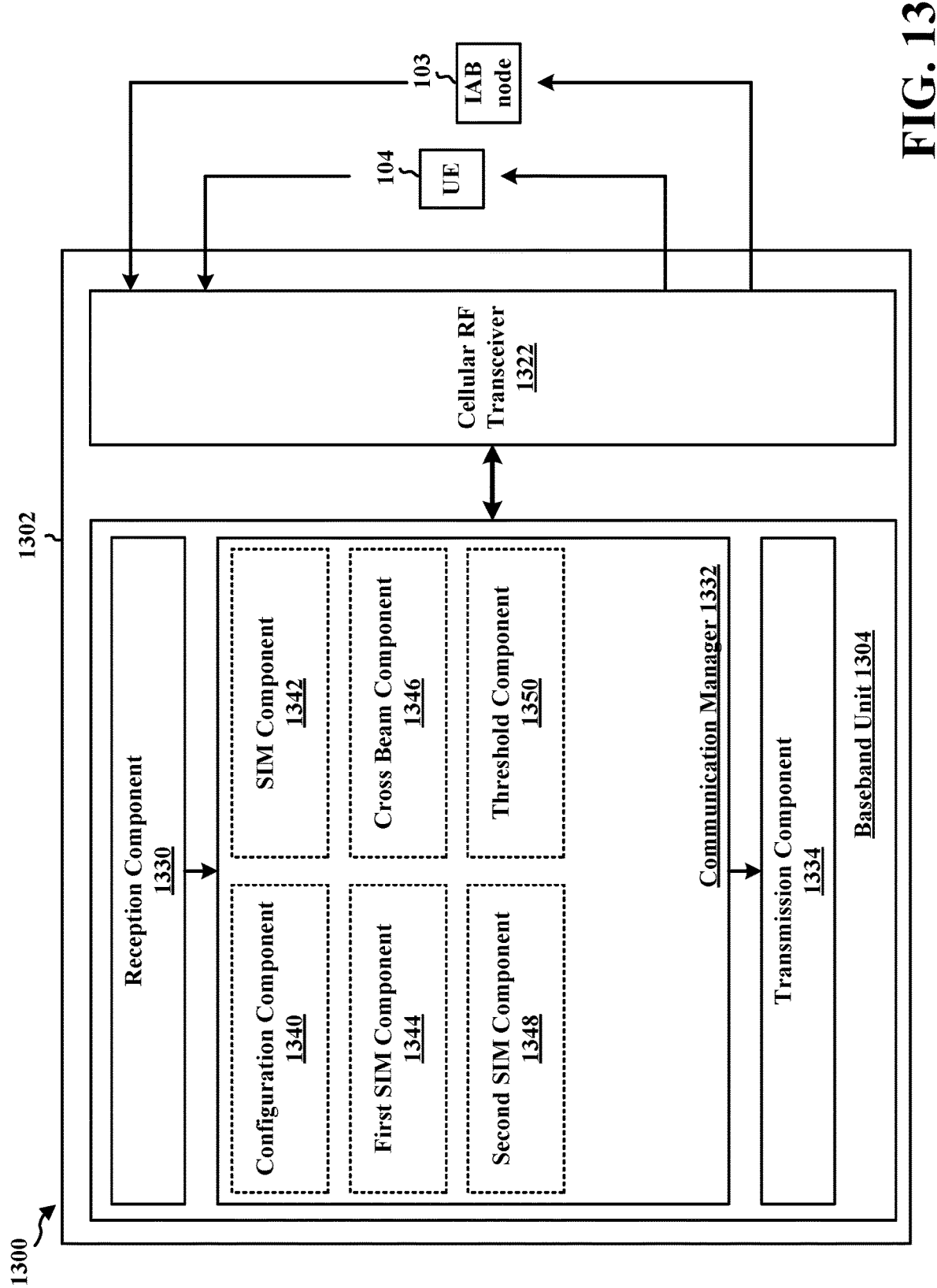
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1002 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the device 310 and may include the memory 376 and/or at least one of the TX processor 316, the RX processor 370, and the controller/processor 375.

The communication manager 1332 includes a configuration component 1340 that may configure a SIM configuration for multiple beam pairs, e.g., as described in connection with 1102 of FIG. 11 or 1202 of FIG. 12. The communication manager 1332 further includes a SIM component 1342 that may transmit the SIM configuration, e.g., as described in connection with 1104 of FIG. 11 or 1204 of FIG. 12. The communication manager 1332 further includes a first SIM component 1344 that may transmit a first SIM configuration to the second wireless device, e.g., as described in connection with 1206 of FIG. 12. The communication manager 1332 further includes a cross beam component 1346 that may receive cross beam measurements for top beam pair candidates, e.g., as described in connection with 1106 of FIG. 11 or 1208 of FIG. 12. The communication manager 1332 further includes a second SIM component 1348 that may transmit a second SIM configuration to the second wireless device, e.g., as described in connection with 1210 of FIG. 12. The communication manager 1332 further includes a threshold component 1350 that may receive the threshold number of iterations, e.g., as described in connection with 1212 of FIG. 12.

The apparatus may include additional components that perform each of the blocks of the algorithm in the flowcharts of FIG. 11 or 12. As such, each block in the flowcharts of FIG. 11 or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for configuring a self-interference measurement (SIM) configuration for multiple beam pairs based on a first transmission power. The apparatus 1302 includes means for transmitting the SIM configuration to a second wireless device. The apparatus includes means for receiving, from the second wireless device, cross beam measurements for top beam pair candidates and one or more beam pairs that meet a criteria based on the SIM performed with the first transmission power. The apparatus further includes means for transmitting a first SIM configuration to the second wireless device. The SIM is performed by the second wireless device with the first transmission power based on the first SIM configuration. The apparatus further includes means for transmitting a second SIM configuration to the second wireless device based on at least the cross beam measurement report. The SIM is performed with a second transmission power based on the second SIM configuration. The apparatus further includes means for receiving the threshold number of iterations from the second wireless device. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first wireless device including a memory and at least one processor coupled to the memory and configured to perform a self-interference measurement (SIM) for multiple beam pairs based on a first transmission power; and perform an iteration of the SIM for one or more beam pairs that meet a criteria, wherein the iteration of the SIM is based on a second transmission power, the second transmission power is greater than the first transmission power.

Aspect 2 is the apparatus of Aspect 1, further includes a transceiver coupled to the at least one processor.

Aspect 3 is the apparatus of Aspects 1 and 2, further includes that the criteria corresponds to a measured cross beam self-interference RSRP being less than a threshold.

Aspect 4 is the apparatus of Aspects 1-3, further includes that the criteria corresponds to a detected clutter echo self-interference.

Aspect 5 is the apparatus of Aspects 1-4, further includes that the criteria corresponds to a measured RTT that is larger than a threshold.

Aspect 6 is the apparatus of Aspects 1-5, further includes that the at least one processor is further configured to receive a first SIM configuration from a second wireless device, wherein the SIM is performed with the first transmission power based on the first SIM configuration.

Aspect 7 is the apparatus of Aspects 1-6, further includes that the at least one processor is further configured to report cross beam measurements for top beam pair candidates and the one or more beam pairs that meet the criteria based on the SIM performed with the first transmission power.

Aspect 8 is the apparatus of Aspects 1-7, further includes that the cross beam measurements include one or more of a cross beam RSRP or a cross beam SINR.

Aspect 9 is the apparatus of Aspects 1-8, further includes that the at least one processor is further configured to receive a second SIM configuration from a second wireless device based on at least a cross beam measurement report, wherein the SIM is performed with the second transmission power based on the second SIM configuration.

Aspect 10 is the apparatus of Aspects 1-9, further includes that the at least one processor is further configured to repeat one or more additional iterations of the SIM based on an increased transmission power per iteration, wherein a respective iteration is performed for a subset of beam pairs that meet the criteria based on measurements performed in a prior iteration.

Aspect 11 is the apparatus of Aspects 1-10, further includes that the first wireless device repeats the one or more additional iterations until reaching a threshold number of iterations or reaching a full transmit power of the first wireless device.

Aspect 12 is the apparatus of Aspects 1-11, further includes that the at least one processor is further configured to receive an indication of the threshold number of iterations from a second wireless device, wherein the threshold number of iterations is determined by the second wireless device.

Aspect 13 is the apparatus of Aspects 1-12, further includes that the first wireless device is a UE, an IAB node, or a child node.

Aspect 14 is a method of wireless communication for implementing any of Aspects 1-13.

Aspect 15 is an apparatus for wireless communication including means for implementing any of Aspects 1-13.

Aspect 16 is a computer-readable medium storing computer executable code, where the code when executed by a processor causes the processor to implement any of Aspects 1-13.

Aspect 17 is an apparatus for wireless communication at a first wireless device including a memory and at least one processor coupled to the memory and configured to configure a SIM configuration for multiple beam pairs based on a first transmission power; transmit the SIM configuration to a second wireless device; and receive, from the second wireless device, cross beam measurements for top beam pair candidates and one or more beam pairs that meet a criteria based on a SIM performed with the first transmission power.

Aspect 18 is the apparatus of Aspect 17, further includes a transceiver coupled to the at least one processor.

Aspect 19 is the apparatus of Aspects 17 and 18, further includes that the criteria corresponds to a measured cross beam self-interference RSRP being less than a threshold.

Aspect 20 is the apparatus of Aspects 17-19, further includes that the criteria corresponds to a detected clutter echo self-interference.

Aspect 21 is the apparatus of Aspects 17-20, further includes that the criteria corresponds to a measured RTT that is larger than a threshold.

Aspect 22 is the apparatus of Aspects 17-21, further includes that the at least one processor is further configured to transmit a first SIM configuration to the second wireless device, wherein the SIM is performed by the second wireless device with the first transmission power based on the first SIM configuration.

Aspect 23 is the apparatus of Aspects 17-22, further includes that the cross beam measurements include one or more of a cross beam RSRP or a cross beam SINR.

Aspect 24 is the apparatus of Aspects 17-23, further includes that the at least one processor is further configured to transmit a second SIM configuration to the second wireless device based on at least a cross beam measurement report, wherein the SIM is performed with a second transmission power based on the second SIM configuration.

Aspect 25 is the apparatus of Aspects 17-24, further includes that the second wireless device repeats one or more additional iterations of the SIM based on an increased transmission power per iteration, wherein a respective iteration is performed for a subset of beam pairs that meet the criteria based on measurements performed in a prior iteration.

Aspect 26 is the apparatus of Aspects 17-25, further includes that the second wireless device repeats the one or more additional iterations until reaching a threshold number of iterations or reaching a full transmit power of the second wireless device.

Aspect 27 is the apparatus of Aspects 17-26, further includes that the at least one processor is further configured to receive an indication of the threshold number of iterations from the second wireless device.

Aspect 28 is the apparatus of Aspects 17-27, further includes that the threshold number of iterations is determined by the first wireless device.

Aspect 29 is the apparatus of Aspects 17-28, further includes that the first wireless device is a base station, an IAB node, or a parent node.

Aspect 30 is a method of wireless communication for implementing any of Aspects 17-29.

Aspect 31 is an apparatus for wireless communication including means for implementing any of Aspects 17-29.

Aspect 32 is a computer-readable medium storing computer executable code, where the code when executed by a processor causes the processor to implement any of Aspects 17-29.

What is claimed is:

1. An apparatus for wireless communication at a first wireless device, comprising:
 a memory; and
 at least one processor coupled to the memory and configured to:
  perform a self-interference measurement (SIM) for multiple beam pairs based on a first transmission power; and
  perform an iteration of the SIM for one or more beam pairs that meet a criteria, wherein the iteration of the SIM is based on a second transmission power, the second transmission power is greater than the first transmission power.

2. The apparatus of claim 1, further comprising a transceiver coupled to the at least one processor.

3. The apparatus of claim 1, wherein the criteria corresponds to a measured cross beam self-interference reference signal receive power (RSRP) being less than a threshold.

4. The apparatus of claim 1, wherein the criteria corresponds to a detected clutter echo self-interference.

5. The apparatus of claim 4, wherein the criteria corresponds to a measured round trip time (RTT) that is larger than a threshold.

6. The apparatus of claim 1, wherein the at least one processor is further configured to:
 receive a first SIM configuration from a second wireless device, wherein the SIM is performed with the first transmission power based on the first SIM configuration.

7. The apparatus of claim 1, wherein the at least one processor is further configured to:
 report cross beam measurements for top beam pair candidates and the one or more beam pairs that meet the criteria based on the SIM performed with the first transmission power.

8. The apparatus of claim 7, wherein the cross beam measurements include one or more of a cross beam reference signal receive power (RSRP) or a cross beam signal to interference plus noise ratio (SINR).

9. The apparatus of claim 1, wherein the at least one processor is further configured to:
 receive a second SIM configuration from a second wireless device based on at least a cross beam measurement report, wherein the SIM is performed with the second transmission power based on the second SIM configuration.

10. The apparatus of claim 1, wherein the at least one processor is further configured to:
 repeat one or more additional iterations of the SIM based on an increased transmission power per iteration, wherein a respective iteration is performed for a subset of beam pairs that meet the criteria based on measurements performed in a prior iteration.

11. The apparatus of claim 10, wherein the first wireless device repeats the one or more iterations until reaching a threshold number of iterations or reaching a full transmit power of the first wireless device.

12. The apparatus of claim 11, wherein the at least one processor is further configured to:
 receive an indication of the threshold number of iterations from a second wireless device, wherein the threshold number of iterations is determined by the second wireless device.

13. The apparatus of claim 1, wherein the first wireless device is a user equipment (UE), an integrated access and backhaul (IAB) node, or a child node.

14. A method of wireless communication at a first wireless device, comprising:
 performing a self-interference measurement (SIM) for multiple beam pairs based on a first transmission power; and
 performing an iteration of the SIM for one or more beam pairs that meet a criteria, wherein the iteration of the SIM is based on a second transmission power, the second transmission power is greater than the first transmission power.

15. The method of claim 14, further comprising:
 receiving a first SIM configuration from a second wireless device, wherein the SIM is performed with the first transmission power based on the first SIM configuration.

16. An apparatus for wireless communication at a first wireless device, comprising:
 a memory; and
 at least one processor coupled to the memory and configured to:
  configure a self-interference measurement (SIM) configuration for multiple beam pairs based on a first transmission power;
  transmit the SIM configuration to a second wireless device; and
  receive, from the second wireless device, cross beam measurements for top beam pair candidates and one or more beam pairs that meet a criteria based on a SIM performed with the first transmission power.

17. The apparatus of claim 16, further comprising a transceiver coupled to the at least one processor.

18. The apparatus of claim 16, wherein the criteria corresponds to a measured cross beam self-interference reference signal receive power (RSRP) being less than a threshold.

19. The apparatus of claim 16, wherein the criteria corresponds to a detected clutter echo self-interference.

20. The apparatus of claim 19, wherein the criteria corresponds to a measured round trip time (RTT) that is larger than a threshold.

21. The apparatus of claim 16, wherein the at least one processor is further configured to:
 transmit a first SIM configuration to the second wireless device, wherein the SIM is performed by the second wireless device with the first transmission power based on the first SIM configuration.

22. The apparatus of claim 16, wherein the cross beam measurements include one or more of a cross beam reference signal receive power (RSRP) or a cross beam signal to interference plus noise ratio (SINR).

23. The apparatus of claim 16, wherein the at least one processor is further configured to:

transmit a second SIM configuration to the second wireless device based on at least a cross beam measurement report, wherein the SIM is performed with a second transmission power based on the second SIM configuration.

24. The apparatus of claim 16, wherein the second wireless device repeats one or more additional iterations of the SIM based on an increased transmission power per iteration, wherein a respective iteration is performed for a subset of beam pairs that meet the criteria based on measurements performed in a prior iteration.

25. The apparatus of claim 24, wherein the second wireless device repeats the one or more additional iterations until reaching a threshold number of iterations or reaching a full transmit power of the second wireless device.

26. The apparatus of claim 25, wherein the at least one processor is further configured to:
    receive an indication of the threshold number of iterations from the second wireless device.

27. The apparatus of claim 25, wherein the threshold number of iterations is determined by the first wireless device.

28. The apparatus of claim 16, wherein the first wireless device is a base station, an integrated access and backhaul (IAB) node, or a parent node.

29. A method of wireless communication at a first wireless device, comprising:
    configuring a self-interference measurement (SIM) configuration for multiple beam pairs based on a first transmission power;
    transmitting the SIM configuration to a second wireless device; and
    receiving, from the second wireless device, cross beam measurements for top beam pair candidates and one or more beam pairs that meet a criteria based on a SIM performed with the first transmission power.

30. The method of claim 29, further comprising:
    transmitting a first SIM configuration to the second wireless device, wherein the SIM is performed by the second wireless device with the first transmission power based on the first SIM configuration.

* * * * *